US012585908B2

(12) United States Patent
Rangaprasad et al.

(10) Patent No.: US 12,585,908 B2
(45) Date of Patent: *Mar. 24, 2026

(54) VISUAL MARKER

(71) Applicant: APPLE INC., Cupertino, CA (US)

(72) Inventors: Arun Srivatsan Rangaprasad, Sunnyvale, CA (US); Anselm Grundhoefer, Campbell, CA (US); Mohamed Selim Ben Himane, Palo Alto, CA (US); Dhruv A. Govil, Vancouver (CA); Joseph M. Luxton, San Francisco, CA (US); Jean-Charles Bernard Marcel Bazin, Sunnyvale, CA (US); Shubham Agrawal, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/802,129

(22) Filed: Aug. 13, 2024

(65) Prior Publication Data

US 2024/0403590 A1 Dec. 5, 2024

Related U.S. Application Data

(63) Continuation of application No. 18/010,578, filed as application No. PCT/US2021/037368 on Jun. 15, 2021, now Pat. No. 12,093,763.

(Continued)

(51) Int. Cl.
*G06K 19/06* (2006.01)
(52) U.S. Cl.
CPC .............................. *G06K 19/06168* (2013.01)

(58) Field of Classification Search
CPC ......... G06K 19/06168; G06K 19/0614; G06K 19/06037
See application file for complete search history.

(56) References Cited

U.S. PATENT DOCUMENTS

| 6,330,356 B1 | 12/2001 | Sundareswaran |
| 7,014,123 B2 | 3/2006 | Lapstun |
| (Continued) | | |

FOREIGN PATENT DOCUMENTS

| CN | 101072641 A | 11/2007 |
| CN | 108764420 A | 11/2018 |
| (Continued) | | |

OTHER PUBLICATIONS

European Patent Office, Article 94 Examination Report, European Patent Application No. 21739215.8, 3 pages, Nov. 14, 2023.

(Continued)

*Primary Examiner* — Matthew Mikels
(74) *Attorney, Agent, or Firm* — Thompson Hine LLP

(57) ABSTRACT

Various implementations disclosed herein include devices, systems, and methods that provide a visual marker including a plurality of markings arranged in a corresponding plurality of shapes. In some implementations, each marking is formed of a set of sub-markings separated by gaps and arranged according to a respective shape, and the gaps of the plurality of markings are configured to encode data and indicate orientation of the visual marker. In some implementations, the plurality of markings are arranged in a plurality of concentric rings of increasing size. In some implementations, the orientation is encoded in a first set of gaps and data in a second set of gaps of the gaps in the plurality of markings.

20 Claims, 11 Drawing Sheets

Related U.S. Application Data

(60) Provisional application No. 63/041,205, filed on Jun. 19, 2020.

(56) References Cited

U.S. PATENT DOCUMENTS

| | | | | |
|---|---|---|---|---|
| 8,224,024 | B2 | 7/2012 | Foxlin | |
| 10,489,930 | B2 | 11/2019 | Weller | |
| 12,093,763 | B2 * | 9/2024 | Rangaprasad | ..... G06K 19/0614 |
| 2009/0294544 | A1 | 12/2009 | Walmsley | |
| 2019/0235531 | A1 | 8/2019 | Liu | |
| 2019/0340477 | A1 | 11/2019 | Xu | |
| 2020/0003559 | A1 | 1/2020 | Kawakami | |
| 2020/0117868 | A1 | 4/2020 | Miyata | |
| 2020/0394481 | A1 | 12/2020 | Brandt | |

FOREIGN PATENT DOCUMENTS

| | | | |
|---|---|---|---|
| CN | 109190742 | A | 1/2019 |
| CN | 110494858 | A | 11/2019 |
| CN | 110517051 | A | 11/2019 |
| CN | 111033527 | A | 4/2020 |
| CN | 111222611 | A | 6/2020 |
| FR | 2968797 | A1 | 6/2012 |
| JP | 2019008564 | A | 1/2019 |
| KR | 101479899 | B1 | 1/2015 |
| KR | 1020180004123 | A | 1/2018 |
| WO | 2019022807 | A1 | 1/2019 |

OTHER PUBLICATIONS

European Patent Office (ISA/EP), International Search Report and Written Opinion, International Application No. PCT/US2021/037368, 13 pp. Oct. 5, 2021.

Siltanen, S., "Theory and applications of marker-based augmented reality," VTT Science 3, 250 pages, 2012.

China National Intellectual Property Administration, Notification of the First Office Action (with English translation), 1 Chinese Patent Application No. 2021800433684, 12 pages, May 19, 2025.

European Patent Office, Communication pursuant to Article 94(3) EPC, European Patent Application No. 21739215.8, 4 pages, Nov. 20, 2025.

National Intellectual Property Administration of The People's Republic of China (with Chinese Translation), Chinese Patent Application No. 202180043368.4, 6 pages, Nov. 26, 2025.

* cited by examiner

[2,3]

[2,4]

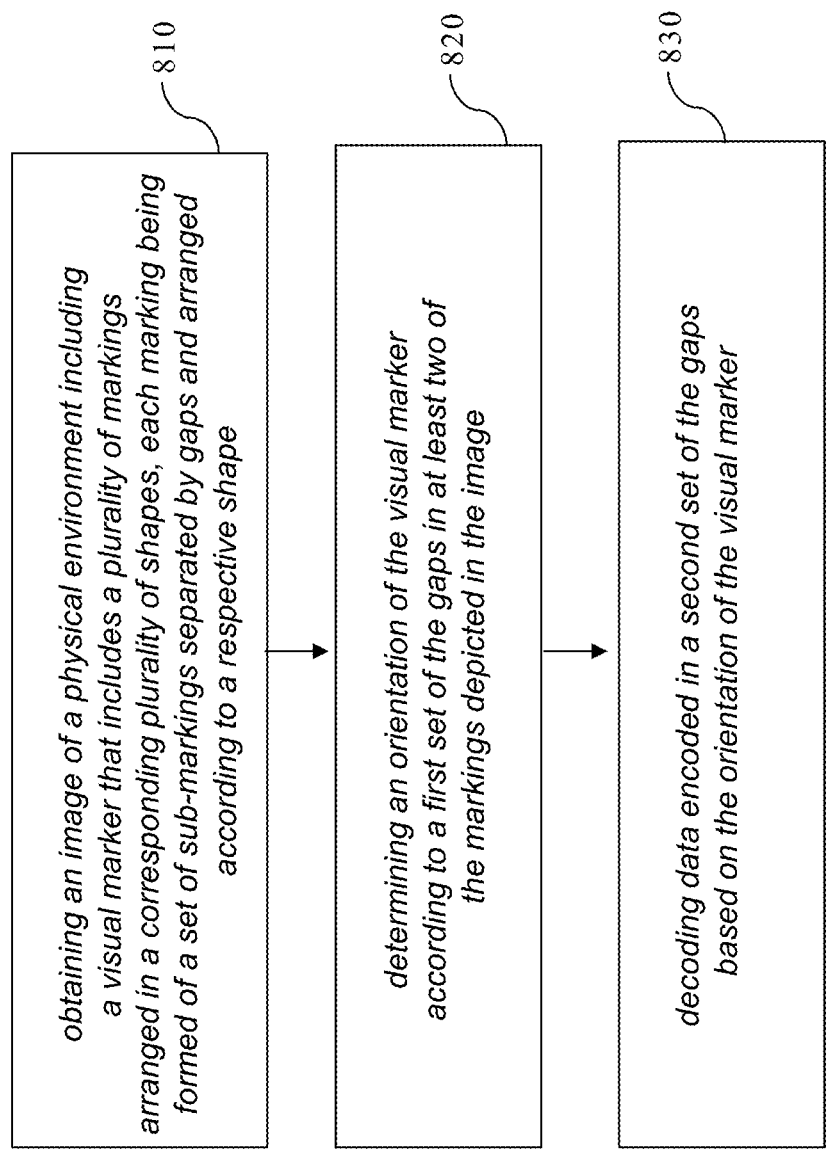

810 obtaining an image of a physical environment including a visual marker that includes a plurality of markings arranged in a corresponding plurality of shapes, each marking being formed of a set of sub-markings separated by gaps and arranged according to a respective shape

820 determining an orientation of the visual marker according to a first set of the gaps in at least two of the markings depicted in the image

830 decoding data encoded in a second set of the gaps based on the orientation of the visual marker

*FIGURE 8*

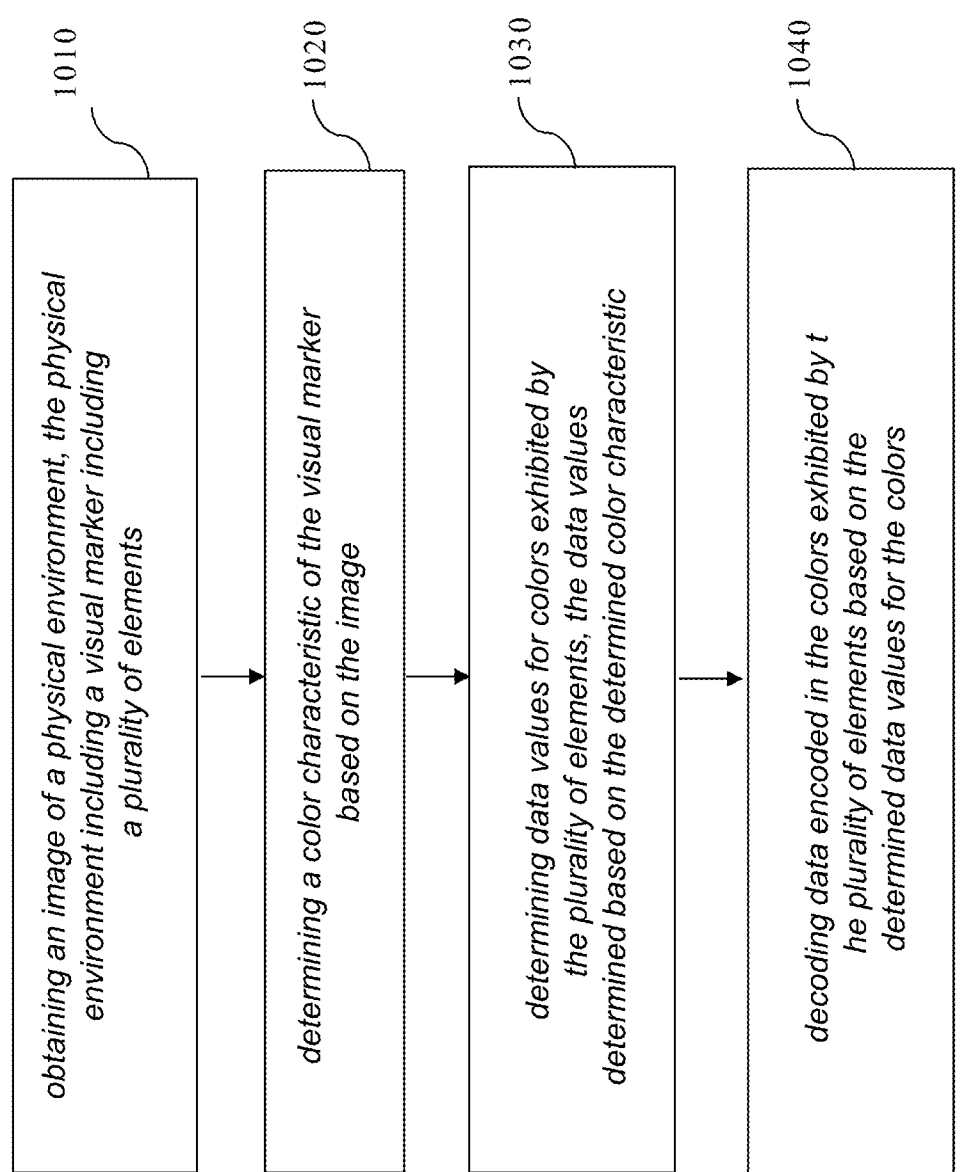

1010 obtaining an image of a physical environment, the physical environment including a visual marker including a plurality of elements

1020 determining a color characteristic of the visual marker based on the image

1030 determining data values for colors exhibited by the plurality of elements, the data values determined based on the determined color characteristic

1040 decoding data encoded in the colors exhibited by the plurality of elements based on the determined data values for the colors

*FIGURE 10*

VISUAL MARKER

CROSS-REFERENCE TO RELATED APPLICATIONS

This application is a continuation of U.S. patent application Ser. No. 18/010,578 filed Dec. 15, 2022, which is the national stage application of International Application No. PCT/US2021/037368 filed Jun. 15, 2021, which claims the benefit of U.S. Provisional Application No. 63/041,205 filed Jun. 19, 2020.

TECHNICAL FIELD

The present disclosure generally relates to visual markers that convey information and to systems, methods, and devices that capture and interpret images of such visual markers to obtain and use the conveyed information.

BACKGROUND

Visual markers exist today in the form of barcodes, Quick Response (QR) codes, and other proprietary formats. QR codes encode binary data such as strings or other payloads.

SUMMARY

Various implementations disclosed herein include visual markers that have multiple markings arranged in multiple shapes. In some implementations, the markings of a visual marker may be configured to both indicate an orientation of the visual marker and convey information. In some implementations, each marking is formed of a set of sub-markings separated by gaps and arranged according to a respective shape. Some of the gaps are positioned to uniquely indicate an orientation of the visual marker. In one example, each marking is a ring formed of ring-segment sub-markings that are spaced to define a template of positions. Some of these positions in the template are selectively filled with other ring-segment sub-markings (representing 1s) or left as gaps (representing 0s) to convey information. Others of these positions in the template are left as gaps to indicate the orientation of the visual marker. For example, gaps at these orientation-indicating template positions may provide a combination of gap locations that is unique to a single orientation of the visual marker. The size, shape, number of positions, and other characteristics of the markings may be configured so that gaps at certain positions provide a combination of gap locations that is unique to a single orientation of the visual marker. Various other implementations disclosed herein decode or otherwise interpret a visual marker to determine an orientation of the visual marker or obtain information conveyed by the visual marker based on that orientation.

In some implementations, the visual marker conveys a first set of information by selectively encoding (e.g., closed or open) a template of gaps between the ring-segment sub-markings, which form a plurality of elements in each marking of the multiple markings. In some implementations, the visual marker conveys a second set of information by selectively coloring a subset of the plurality of elements.

In some implementations, a visual marker that conveys information includes a plurality of markings arranged in a corresponding plurality of shapes, each marking being formed of a set of sub-markings separated by gaps and arranged according to a respective shape, wherein the gaps of the plurality of markings are configured to convey information (e.g., encode data) and indicate orientation of the visual marker.

In some implementations, at an electronic device having a processor, a method includes obtaining an image of a physical environment, the physical environment including a visual marker including a plurality of markings arranged in a corresponding plurality of shapes, each marking being formed of a set of sub-markings separated by gaps and arranged according to a respective shape. An orientation of the visual marker is determined according to a first set of the gaps in at least two of the markings of the plurality of markings depicted in the image. Then, data encoded in a second set of the gaps is decoded based on the orientation of the visual marker.

In some implementations, at an electronic device having a processor, a method includes obtaining an image of a physical environment, the physical environment including a visual marker including a plurality of elements. Then, a color characteristic of the visual marker is determined based on the image. In some implementations, data values are determined for colors exhibited by the plurality of elements, the data values determined based on the determined color characteristic. Then, data encoded in the colors exhibited by the plurality of elements is decoded based on the determined data values for the colors.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 8 is a flowchart illustrating an exemplary method of decoding a visual marker that indicates orientation and conveys information in accordance with some implementations.

FIG. 10 is a flowchart illustrating an exemplary method of decoding a visual marker that conveys information using color in a plurality of elements forming a plurality of markings arranged in a corresponding plurality of shapes of increasing size in accordance with some implementations.

Figure 1:
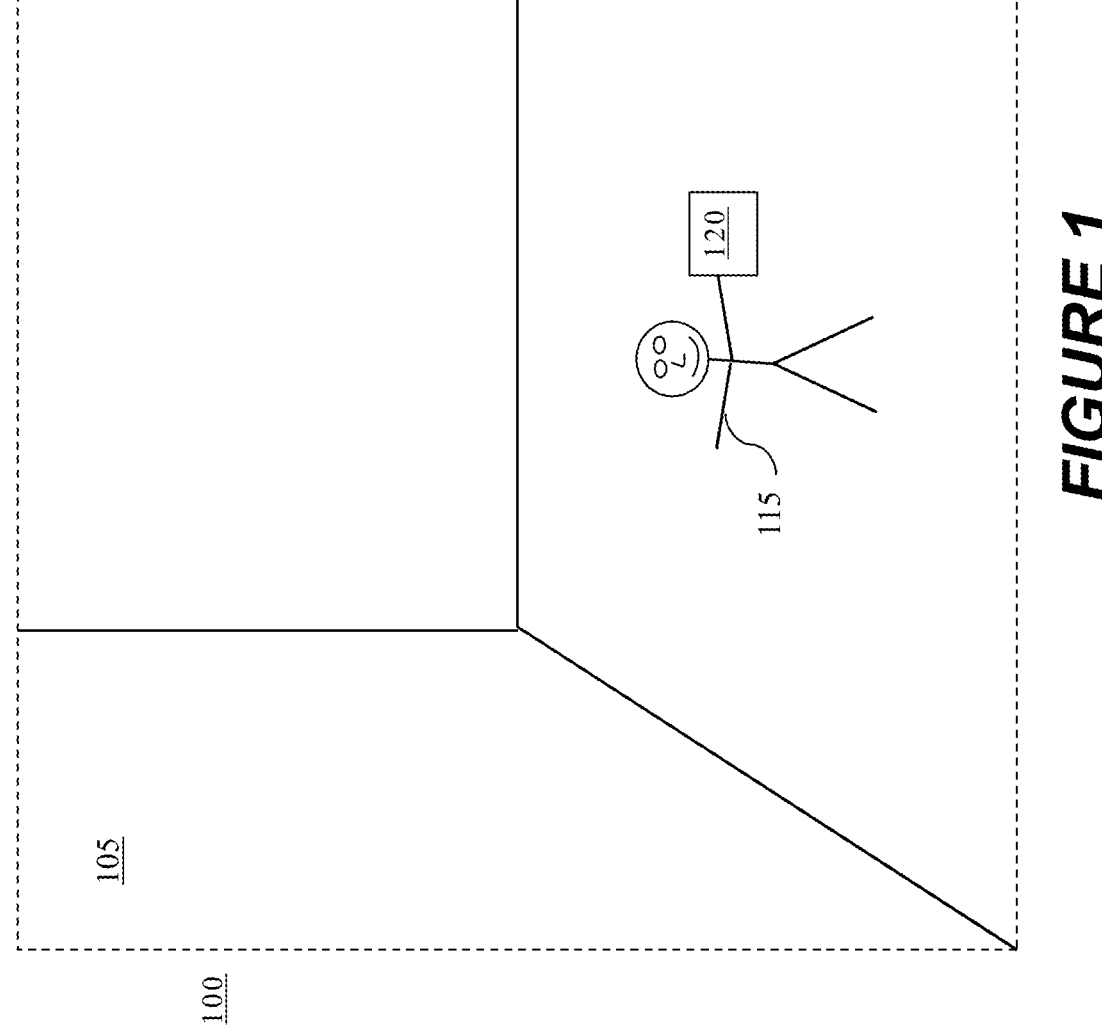
FIG. 1 is a diagram of an example operating environment in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates an example operating environment 100 in which electronic device 120 is used in physical environment 105. A physical environment refers to a physical world that people can interact with and/or sense without the aid of electronic systems. Physical environments, such as a physical park, include physical articles, such as physical trees, physical buildings, and physical people. People can directly sense and/or interact with the physical environment, such as through sight, touch, hearing, taste, and smell.

In the example of FIG. 1, the device 120 is illustrated as a single device. Some implementations of the device 120 are hand-held. For example, the device 120 may be a mobile phone, a tablet, a laptop, and so forth. In some implementations, the device 120 is worn by a user. For example, the device 120 may be a watch, a head-mounted device (HMD), head-worn device (glasses), and so forth. In some implementations, functions of the device 120 are accomplished via two or more devices, for example additionally including an optional base station. Other examples include a laptop, desktop, server, or other such device that includes additional capabilities in terms of power, CPU capabilities, GPU capabilities, storage capabilities, memory capabilities, and the like. The multiple devices that may be used to accomplish the functions of the device 120 may communicate with one another via wired or wireless communications.

In some implementations, the electronic device 120 is configured to capture, interpret, and use a visual marker, for example, to present content to the user 115. In some implementations, the electronic device 120 captures one or more images of the physical environment, including of the visual marker. The electronic device 120 may identify the visual marker in the one or more images and use the corresponding portions of the one or more images to determine an orientation of the visual marker and interpret information conveyed by the visual marker based on the orientation.

Figure 2:
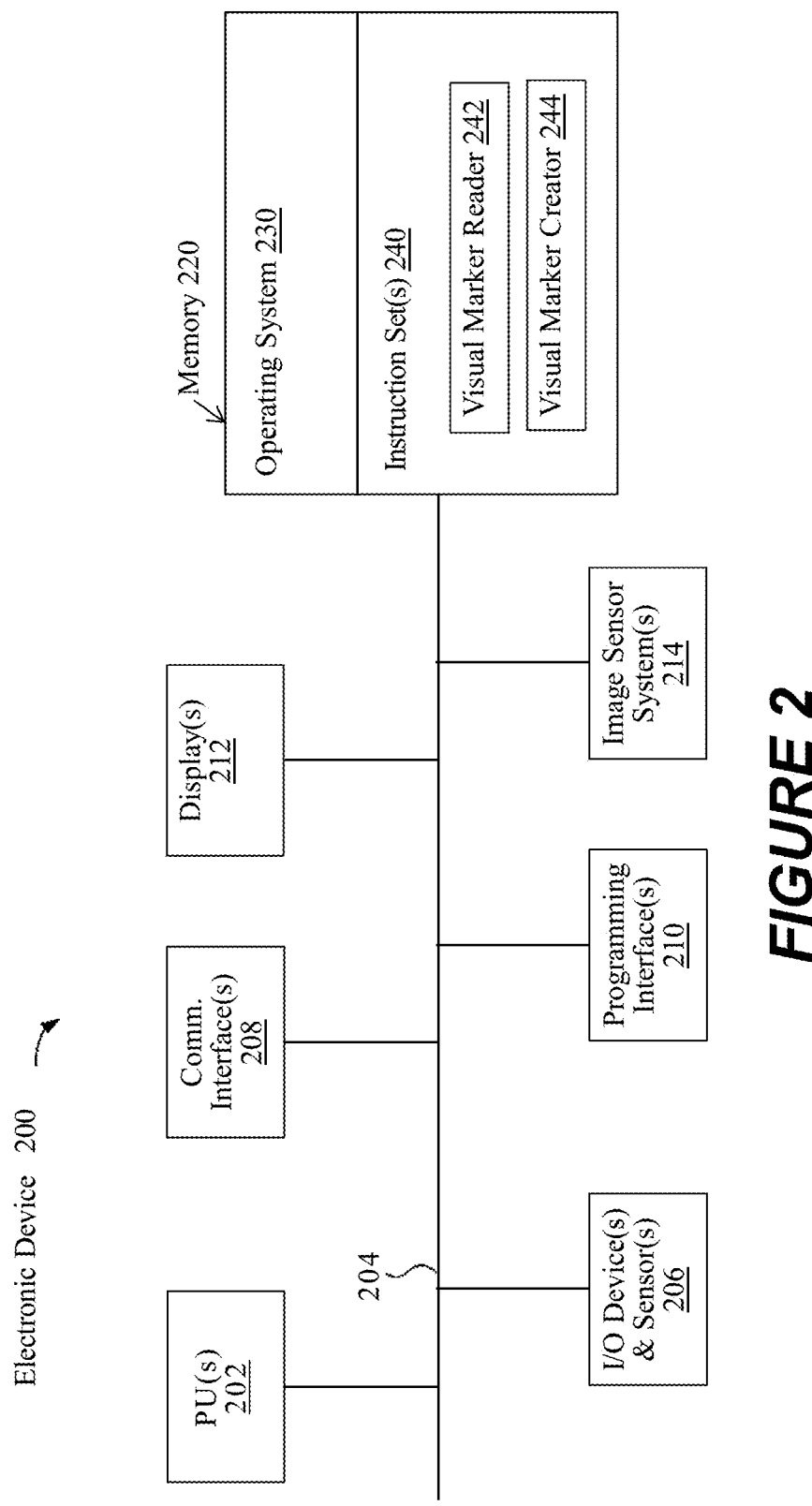
FIG. 2 is a diagram of an example electronic device in accordance with some implementations.

FIG. 2 is a block diagram of an example device 200. Device 200 illustrates an exemplary device configuration for the device 120. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 200 includes one or more processing units 202 (e.g., microprocessors, ASICs, FPGAs, GPUs, CPUs, processing cores, or the like), one or more input/output (I/O) devices and sensors 206, one or more communication interfaces 208 (e.g., USB, FIRE-WIRE, THUNDERBOLT, IEEE 802.3x, IEEE 802.11x, IEEE 802.16x, GSM, CDMA, TDMA, GPS, IR, BLU-ETOOTH, ZIGBEE, SPI, I2C, or the like type interface), one or more programming (e.g., I/O) interfaces 210, one or more displays 212, one or more interior or exterior facing sensor systems 214, a memory 220, and one or more communication buses 204 for interconnecting these and various other components.

In some implementations, the one or more communication buses 204 include circuitry that interconnects and controls communications between system components. In some implementations, the one or more I/O devices and sensors 206 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 212 are configured to present content to the user. In some implementations, the one or more displays 212 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 212 correspond to diffractive, reflective, polarized, holographic, etc. waveguide displays. For example, the electronic device 200 may include a single display. In another example, the electronic device 200 includes a display for each eye of the user.

In some implementations, the one or more interior or exterior facing sensor systems 214 include an image capture device or array that captures image data or an audio capture device or array (e.g., microphone) that captures audio data. The one or more image sensor systems 214 may include one or more RGB cameras (e.g., with a complimentary metal-oxide-semiconductor (CMOS) image sensor or a charge-coupled device (CCD) image sensor), monochrome cameras, IR cameras, event-based cameras, or the like. In various implementations, the one or more image sensor systems 214 further include an illumination source that emits light such as a flash. In some implementations, the one or more image sensor systems 214 further include an on-camera image signal processor (ISP) configured to execute a plurality of processing operations on the image data.

The memory 220 includes high-speed random-access memory, such as DRAM, SRAM, DDR RAM, or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium.

In some implementations, the memory 220 or the non-transitory computer readable storage medium of the memory 220 stores an optional operating system 230 and one or more instruction set(s) 240. The operating system 230 includes procedures for handling various basic system services and for performing hardware dependent tasks. In some implementations, the instruction set(s) 240 include executable software defined by binary information stored in the form of electrical charge. In some implementations, the instruction set(s) 240 are software that is executable by the one or more processing units 202 to carry out one or more of the techniques described herein.

In some implementations, the instruction set(s) 240 include a visual marker reader 242 that is executable by the processing unit(s) 202 to identify a visual marker, determine an orientation of the visual marker, and interpret information conveyed by the visual marker based on the orientation. In some implementations, the visual marker reader 242 is executed to detect and interpret a visual marker present in one or more images of a physical environment captured, for example, by one or more interior or exterior facing sensor systems 214.

In some implementations, the instruction set(s) 240 include a visual marker creator 244 that is executable by the processing unit(s) 202 to create a visual marker that indicates orientation and conveys information according to one or more of the techniques disclosed herein.

Although the instruction set(s) 240 are shown as residing on a single device, it should be understood that in other implementations, any combination of the elements may be located in separate computing devices. FIG. 2 is intended more as a functional description of the various features which are present in a particular implementation as opposed to a structural schematic of the implementations described herein. As recognized by those of ordinary skill in the art, items shown separately could be combined and some items could be separated. For example, actual number of instruction sets and the division of particular functions and how features are allocated among them will vary from one implementation to another and, in some implementations, depends in part on the particular combination of hardware, software, or firmware chosen for a particular implementation.

Figures 3, 4:
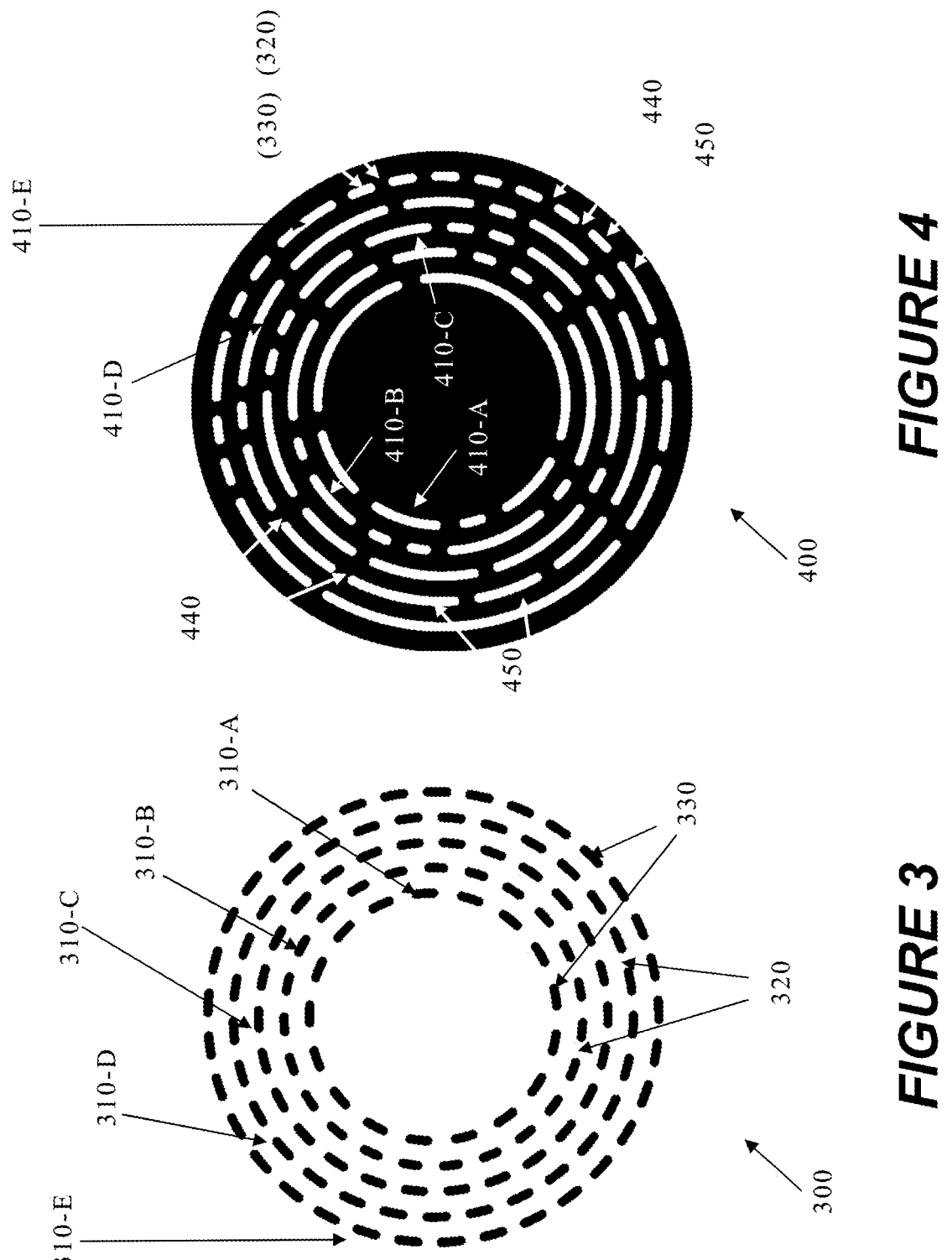
FIGS. 3-4 are diagrams illustrating exemplary visual markers that indicate orientation and conveys information using gaps in a plurality of increasingly larger markings in accordance with some implementations.
Figure 6:
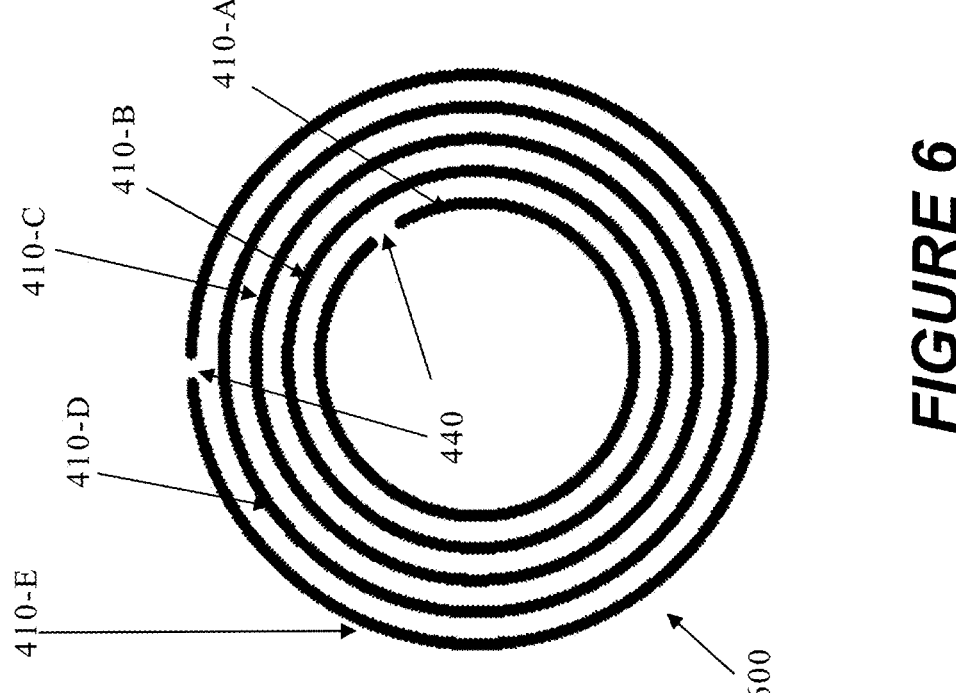
FIG. 6 is a diagram illustrating an exemplary visual marker that indicates orientation and conveys information using gaps in a plurality of increasingly larger markings in accordance with some implementations.

FIGS. 3-4 and 6 are diagrams illustrating exemplary visual markers that indicate orientation and convey data using gaps in a plurality of increasingly larger markings in accordance with some implementations. In some implementations, a visual marker 300 is a template (e.g., an unencoded visual marker) and a visual marker 400 is an instance (e.g., conveying information) of the visual marker 300 template. In some implementations, a visual marker 600 is another instance (e.g., conveying information) of the visual marker 300 template. In some implementations, the visual marker 300 includes a plurality (e.g., a series) of increasingly larger markings, where each of the markings is the same or different shape. In some implementations, the visual marker 300 includes a plurality of increasingly larger markings, where at least one of the markings uses a different shape. In some implementations, the visual marker 300 includes a plurality of concentric markings. In some implementations, the visual marker 300 includes a plurality of increasingly larger markings (e.g., increasingly larger rings), where each of the markings has a different number of gaps that are used to convey information.

As shown in FIG. 3, the visual marker 300 includes a plurality of markings arranged in a corresponding plurality of shapes (e.g., each marking is an identically-shaped ring). In some implementations, each marking of a plurality of rings 310A-310E is formed of sub-markings 330 arranged according to (e.g., along) a respective shape (e.g., one of rings 310A-310E) and defining positions according to (e.g., along) the respective shape (e.g., one of rings 310A-310E). In some implementations, each ring of the plurality of rings 310A-310E may include fixed sub-markings 330 that define a template (e.g., grid) of gaps 320 used to convey information in the visual marker 300. In some implementations, the template of gaps 320 is selectively filled to convey information or orientation. In some implementations, the template of gaps 320 is selectively filled with sub-markings to convey at least 1 bit of information. In some implementations, each ring of the plurality of rings 310A-310E may include fixed sub-markings 330 that define a template of positions that is in every visual marker (e.g., before being coded, unencoded, or without data) of a type of visual marker shown in FIGS. 4 and 6.

In some implementations, the template of gaps 320 or positions is selectively filled with sub-markings (e.g., representing a "1" bit) or left as gaps (e.g., representing a "0" bit) to convey information in an instance of the visual marker 300 template (e.g., encoded visual marker 400). In some implementations, the size of the gaps 320 in each of the rings 310A-310E are the same. In some implementations, the size of the gaps 320 in all of the rings 310A-310E are the same. In some implementations, a sequence of data represented using a plurality of encoded adjacent gaps (e.g., encoded gaps 320 in the visual marker 400) of an encoded marking (e.g., of the plurality of rings 410A-410E) may indicate a data sequence, e.g., 0100101.

FIG. 4 illustrates an exemplary visual marker 400, which indicates orientation and conveys information using gaps in a plurality of markings arranged in a corresponding plurality of shapes, in accordance with some implementations. In some implementations, the visual marker 400 includes a plurality of increasingly larger surrounding markings, where each of the markings is the same shape. In some implementations, the visual marker 400 includes a plurality of increasingly larger markings, where at least one of the markings uses a different shape. In some implementations, the plurality of markings of the visual marker 400 are equally spaced apart. In some implementations, the plurality of markings of the visual marker 400 are not equally spaced apart.

As shown in FIG. 4, a visual marker 400 includes a plurality of concentric rings 410A-410E that each may have a different number of gaps that are used to store information. In some implementations, each of the concentric rings is larger going from an innermost concentric ring 410A to an outermost concentric ring 410E. In some implementations, each of the rings 410A-410E when encoded with information includes a number of arcs 450 with gaps 440 between 2 adjacent arcs 450. In some implementations, the gaps 440 represent at least a binary digit (bit) of information. In some implementations, empty gaps 440 represent a "0", and filled gaps (e.g., 320) forming larger sized ones of the arcs 450 represents at least one "1". In some implementations, the size of the gaps 440 in each of the rings 410A-410E are the same. In some implementations, the size of the gaps 440 in all of the rings 410A-410E are the same. In some implementations, the visual marker 400 encodes 128 bits (e.g., including parity or error correction bits) using the gaps 440 and the arcs 450.

In some implementations, the visual marker 300 template shown in FIG. 3 is considered to represents all 0s while the visual marker 400 shown in FIG. 4 is encoded with some data (e.g., template gaps 320 are selectively filled with sub-markings indicating Is for those data values). In some implementations, the template gaps 320 are selectively filled with parameterized graphical elements to encode more than 1 bit of data in the visual marker 400.

In some implementations, the visual marker 400 conveys information (e.g., indicates orientation and encodes data) and the visual marker 300 is capable of conveying information (e.g., a payload indicating orientation and encoding data) using the gaps 320. In some implementations, the visual marker 400 encodes meta-data, argument data, or corresponding parity data in the template gaps 320 to form the gaps 440 and the arcs 450. In some implementations, the visual marker 400 indicates an orientation of the visual marker 400 in the gaps 440 (e.g., the gaps 320). In some implementations, the visual marker 400 encodes aesthetic data of the visual marker 400 in the gaps 440 and the arcs 450 (e.g., using the template gaps 320).

In some implementations, the visual markers 400, 300 have a single detectable orientation. In some implementations, the visual markers 400, 300 use the gaps 320 to determine the single detectable orientation. In some implementations, the number of gaps 320 in each of the rings 310A-310E, 410A-410E is selected so that there is only one orientation where all the gaps 320 align in the visual markers 300, 400. In some implementations, respective numbers of gaps 320 in each of the rings 310A-310E, 410A-410E are selected to not have a common divisor, which ensures the single orientation of the visual markers 300, 400. As shown in FIGS. 3-4, the respective numbers of gaps 320 in each of the rings 310A-310E, 410A-410E are 17, 23, 26, 29, 33 in the visual marker 300 template and the visual marker 400 (e.g., filled and empty).

In some implementations, the orientation may be used to determine where to start to read, to decode, or otherwise to interpret the information represented by the arcs 450 and the gaps 440 present at the positions of the gaps 320 in the visual marker 400. For example, reading data in the oriented visual marker 400 may begin at 6 o'clock position and go counterclockwise in each of the rings 410A-410E to interpret the information represented by the arcs 450 and the gaps 440 present at the positions of the gaps 320, and the innermost ring 410A may be decoded as 11111011101010010.

Figure 5B:
FIGS. 5A-5B are diagrams illustrating example configurations of two concentric rings of an exemplary visual marker.
Figure 5A:
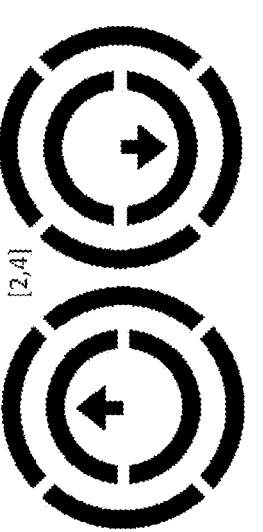

FIGS. 5A-5B are diagrams illustrating example of 2 concentric rings having different numbers of gaps. As shown in FIG. 5A, an inner ring has 2 gaps and an outer ring has 4 gaps. In FIG. 5A, the 2 concentric rings have an ambiguous orientation because the gaps in the 2 concentric rings align twice (e.g., at 0° and at 180°). As shown in FIG. 5B, an inner ring has 2 gaps and an outer ring has 3 gaps. In FIG. 5B, the 2 concentric rings have an unambiguous orientation because the gaps in the 2 concentric rings align in a single orientation. In FIG. 5B, the number of gaps in the 2 concentric rings do not have a common divisor.

FIG. 6 illustrates an exemplary visual marker 600, which indicates orientation and conveys information using gaps in a plurality of markings arranged in a corresponding plurality of shapes, in accordance with some implementations. As shown in FIG. 6, the respective numbers of gaps 320 (e.g., filled and empty) in each of the rings 410A-410E is 17, 23, 26, 29, 33 in the visual marker 600, which conveys information (e.g., different information than the visual marker 400). As shown in FIG. 6, at least 2 rings of the rings 410A-410E with 1 gap (e.g., 440) each are used to indicate the orientation of the visual marker 600 without ambiguity. In some implementations, at least one gap (e.g., 440) in each ring 410A-410E is used to indicate the orientation of the visual marker 600. In some implementations, at least one of the rings 410A-410E includes more than one gap (e.g., 440) to determine the orientation of a visual marker 600.

In some implementations, the visual markers 300, 400, 600 include a first subset of the gaps 320 that indicate an orientation of the visual marker 300, 400, 600. In some implementations, the visual markers 300, 400, 600 include a second subset of the gaps 320 that convey information (e.g., encoded data) of the visual marker 400, 600.

In some implementations, the visual markers 300, 400, 600 include a first subset of the gaps 320 that include at least one gap 320 in at least 2 of the rings 310A-310E, 410A-410E. In some implementations, the first subset of the gaps 320 that includes at least one gap 320 in at least 2 of the rings 310A-310E, 410A-410E that are filled in (e.g., closed) unless by encoding the data (e.g., payload) for the visual markers 400, 600, the corresponding ring of the rings 410A-410E becomes solid (e.g., completely filled with no gaps), and then that at least 1 gap 320 of the first subset of gaps 440 is unfilled (e.g., opened).

In some implementations, the visual marker 400 includes a first color (e.g., a foreground color) for the arcs 450 and a second color (e.g., background color) for the gaps 440. In some implementations, filled gaps 320 are filled with the first color to form the arcs 450. In some implementations, when the gaps 440 corresponding to the gaps 320 are the background color, the gaps 440 of the visual marker 400 represents a "0" bit (e.g., empty). In some implementations, when the arcs 450 are the foreground color and larger in size than the sub-markings 330, that gap 320, which is filled to form one of the arcs 450, represents a "1" bit (e.g., filled).

In some implementations, the first color of the plurality of markings (e.g., rings 310A-310E, 410A-410E) of the visual marker and the second color for the background of the visual marker are selected anywhere within a spectrum of colors. In some implementations, the first color and the second color of the visual marker may be any color, but generally the two colors are selected based on detectability or aesthetics. In some implementations, detectability of the two colors is based on one or more of separation in a 3D color space, lighting conditions, printing conditions, displaying conditions, image capture sensors, or aesthetic information. In some implementations, the colors for the visual marker 400 are not used to encode data.

In some implementations, the visual marker 400 provides a detectable orientation or conveys information without using oversized features in the visual marker. In some implementations, the visual marker 400 provides a detectable orientation or conveys information without using undersized features in the visual marker. In some implementations, the visual marker 400 provides a detectable orientation or conveys information without using colored features in the visual marker.

Figure 7:
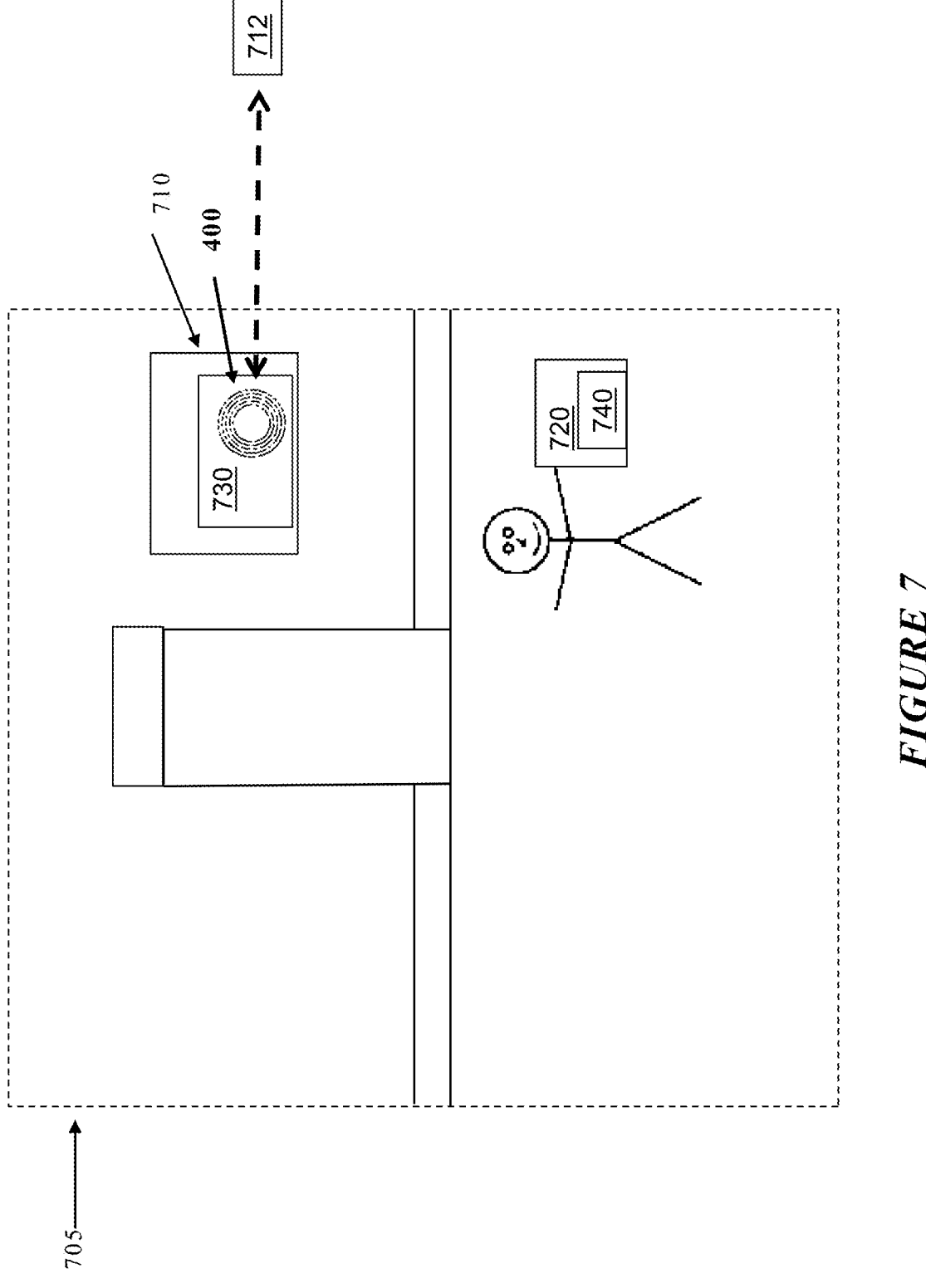
FIG. 7 is a diagram illustrating a visual marker detectable by an electronic device in a physical environment in accordance with some implementations.

FIG. 7 is a diagram illustrating a visual marker detectable by an electronic device in a physical environment in accordance with some implementations. As shown in FIG. 7, the visual marker 400 in a physical environment 705 is detected by a second electronic device 720. In some implementations, the visual marker 400 is on the surface of an object 710. In some implementations, the object 710 is a first electronic device that includes a visual production device such as a display or projector.

As shown in FIG. 7, the visual marker 400 is a 2D/3D object that encodes information in a preset format (e.g., binary format) such as strings or other payloads used to access remotely-based experiences 712. In some implementations, the links to the remotely-based experiences 712 include links to initiate payments (e.g., sanctioned payment endpoints), links to websites (e.g., URLs), or links that launch into web-based experiences. In some implementations, the visual marker 400 is used to launch only into or link only to sanctioned remotely-based experiences 712 authorized by the creator of the visual marker 400. In some implementations, the creator of the visual markers includes an entity that designs the visual marker, an entity that prints (e.g., makes) the visual marker (e.g., developer), as well as an entity that manages/hosts the visual markers. In some implementations, the visual marker 400 may not encode a URL.

As shown in FIG. 7, in some implementations the image of the physical environment 705 is obtained using a sensor (e.g., a camera 740) on the electronic device 720. In some implementations, the sensor can be a RGB camera, stereo cameras, a depth sensor (e.g., time of flight, structured light), a RGB-D camera, monochrome camera, one or more 2D cameras, IR cameras, dynamic vision sensors (event cameras), or the like. In some implementations, color images can be used. Alternatively, in some implementations, grayscale images can be used. In some implementations, the captured images are a 2D image or 3D image at the electronic device 720. FIG. 7 illustrates electronic devices that may include some or all the features of one or both of the electronic device 120, 200.

FIG. 8 is a flowchart illustrating an exemplary method of decoding a visual marker, which indicates orientation and conveys information using gaps in a plurality of markings arranged in a corresponding plurality of shapes of increasing size, in accordance with some implementations. In some implementations, the plurality of markings are arranged in a corresponding plurality of expanding concentric rings. In some implementations, the orientation is provided and data is conveyed using template gaps in the plurality of markings. In some implementations, the orientation is provided using a first set of gaps and data is conveyed using a second different set of gaps in the plurality of markings. In some implementations, the method 800 is performed by a device (e.g., electronic device 120, 200 of FIGS. 1-2). The method 800 can be performed using an electronic device or by multiple devices in communication with one another. In some implementations, the method 800 is performed by processing logic, including hardware, firmware, software, or a combination thereof. In some implementations, the method 800 is performed by a processor executing code stored in a non-transitory computer-readable medium (e.g., a memory).

At block 810, the method 800 obtains an image of a physical environment including a visual marker that includes a plurality of markings arranged in a corresponding plurality of shapes, each marking of the plurality of markings is formed of a set of sub-markings arranged according to a respective shape and separated by gaps. In some implementations, the plurality of markings form a plurality of identical at least partially surrounding circles, ellipses, rectangles, polygons, stars, or other shapes of different sizes (e.g., increasing, decreasing). In some implementations, the plurality of markings are concentric. In some implementations, a first marking corresponds to an inner ring, a second marking corresponds to a second ring that surrounds the first ring, a third marking corresponds to a third ring that surrounds the second ring, and so on. In some implementations, the gaps in the plurality of markings may have a consistent size. In some implementations, the visual marker has a unique detectable orientation.

In some implementations at block 810, the visual marker is viewable at a surface of an object in the physical environment. In some implementations, the visual marker is printed on the surface of the object. In some implementations, the visual marker is printed by a 2D or 3D printer. In some implementations, the visual marker is printed by a black and white printer or a color printer (e.g., RGB or CYMK). In some implementations, the visual marker is colored etched, painted, powdered, drawn, sprayed, or the like onto the surface of the object. In some implementations, the visual marker is displayed by a display or projected by a projector on the object in the physical environment. In some implementations, the display or the projector is self-luminescent, emissive, transmissive, or reflective.

In some implementations at block 810, an image sensor at an electronic device captures the image of the physical environment including the visual marker. In some implementations, a detecting electronic device (e.g., including the image sensor) detects the visual marker in the image of the physical environment. In some implementations, the visual marker is detected by finding a pre-determined shape of a selected portion (e.g., one marking of the plurality of markings) of the visual marker in the image. In some implementations, the sensor can be a RGB camera, a depth sensor, a RGB-D camera, monochrome cameras, one or more 2D cameras, event cameras, IR cameras, or the like. In some implementations, combinations of sensors are used. In some implementations, the sensor is used to generate an extended reality (XR) environment representing the physical environment. In some implementations, color images can be used. Alternatively, in some implementations, grayscale images can be used.

At block 820, the method 800 determines an orientation of the visual marker according to a first set of the gaps in at least two of the markings of the plurality of markings depicted in the image. In some implementations, the orientation is determined using at least 1 gap of first set of the gaps in two different markings of the plurality of markings depicted in the image. In some implementations, determining the orientation includes determining a unique orientation of the visual marker corresponding to relative positioning of the first set of gaps. In some implementations, respective numbers of template gaps in each of the plurality of markings are respectively selected to not have a common divisor to provide a single detectable orientation of the visual marker. In some implementations, the image may be rectified to account for image capture conditions.

At block 830, the method 800 decodes data encoded in a second set of the gaps based on the orientation of the visual marker. In some implementations, the data is encoded using a second set of gaps of the template gaps in the plurality of markings. In some implementations, the second set of gaps and the first set of gaps are the same gaps in the plurality of markings. In some implementations, the data is encoded in the second set of gaps, which is different from the first set of gaps, in the plurality of markings.

In some implementations at block 830, decoding includes clustering pixels of the plurality of markings into one of the corresponding plurality of markings. In some implementations, clustering uses a data driven, learned segmentation method such as a semantic segmentation deep learning model to classify pixels of the plurality of markings into a plurality of classes that each represent one of the corresponding plurality of markings and at least one other class (e.g., error, outlier, occlusion, etc.). In some implementations, clustering uses k-means clustering and iterative matching to classify pixels of the plurality of markings into a plurality of classes that each represent one of the corresponding plurality of shapes and at least one other class (e.g., error, outlier, occlusion, etc.).

In some implementations at block 830, clustering includes randomly selecting a plurality of points as a set of points from pixels of the plurality of markings (e.g., after binarization or image segmentation), and hypothesizing a modeled shape from the selected set of points. For example, 5 randomly selected pixels from pixels of the plurality of markings form a set of points that is used to hypothesize a uniquely defined ellipse as a modeled shape. In another example, 3 randomly selected pixels from pixels of the plurality of markings form a set of points that is used to hypothesize a uniquely defined circle as a modeled shape. In some implementations, the random selection and hypothesize steps are repeated a prescribed number of iterations (e.g., 1000 times) or until at least one alternative stopping criteria is met (e.g., number of inliers detected, model fitting cost). In some implementations, a first shape of the corresponding plurality of shapes is determined from the hypothesized modeled shape leading to the largest set of the plurality of points close to that shape (e.g., up to a distance threshold) obtained during the iterations. In some implementations, the best set of points (e.g., the set of points leading to the highest number of points near the hypothesized modeled shape) is used to determine the shape of one of the plurality of concentric shapes (e.g., one concentric ring or a first concentric ring of the plurality of concentric rings) of the visual marker. In one example, remaining pixels of the plurality of markings are clustered into corresponding groups for each of the remaining concentric rings independently (e.g., as described above for the first concentric ring or outermost concentric ring). Then for each additional concentric ring, the best set of points leading to the largest set of the plurality of points close to that shape (e.g., up to a distance threshold) is determined. In this example, the pixels clustered to each of the concentric rings may be removed from the analysis for the remaining concentric rings. Thus, in some implementations, pixels of the plurality of markings are independently clustered into one of the corresponding plurality of markings. In some implementations, preset relationships such as size or distance exist and are known between the plurality of concentric markings arranged in the corresponding plurality of shapes (e.g., the plurality of concentric rings) and based on the shape of one of the markings (e.g., rings), this information can be used to hallucinate the other markings (e.g., estimate the shape of the other or remaining concentric rings). In some implementations, once the remaining concentric markings are estimated, the best set of points (e.g., described above) is used to determine the shape of each of the remaining concentric markings. In some implementations, the clustered pixels in each of the plurality of markings are concurrently compared for matching gaps in the sets of template sub-markings of the plurality of markings to detect the orientation of the visual marker for decoding the visual marker.

In some implementations at block 830, the method 800 further decodes the data of the visual marker sequentially in the plurality of markings (e.g., ordered by marking such as innermost to outermost marking and clockwise/counterclockwise) from a starting position based on the orientation of the visual marker. In some implementations at block 830, the method 800 further decodes the data of the visual marker into binary data such as strings or other payloads to initiate payments, link to websites, link to location-based experiences or contextual-based experiences, or launch into other web-based experiences. In some implementations, the usage of the visual marker in terms of user experience after decoding can be arbitrary. For example, the visual marker may be displayed on a TV and upon being scanned, the decoded data may help the user select options, obtain information about the movie being displayed on the TV, etc. In another example, the decoded data from the visual marker when scanned by the user may initiate an application on the scanning electronic device (e.g., smart phone) such as a food delivery app. In some implementations, the visual marker may be displayed and upon being scanned, the decoded data delivers an audio message or music to the decoding electronic device.

In some implementations, the visual marker depicted in the image is binarized before orientation determination or data decoding. In some implementations, the pixels of the plurality of markings arranged in the corresponding plurality of shapes are changed to a first color (e.g., black) and remaining pixels to a second color (e.g., white).

In some implementations, colors (e.g., two or more) of the visual marker can be any color, however, the colors are selected based on detectability or aesthetics. Thus, a first color used for the plurality of markings of the visual marker and a second color used for a background of the visual marker are selected anywhere within a spectrum of colors.

In some implementations, a version of the visual marker is encoded in a first portion (e.g., first or innermost marking) of the plurality of markings, and orientation is indicated with the encoded data of the visual marker in a second portion (e.g., remaining markings) of the plurality of markings. In some implementations, the version of the visual marker is encoded using a first encryption type, and the second portion is encoded using a second different encryption type. In some implementations, the version encodes a number of the plurality of markings (e.g., 4, 5, 6, etc. concentric rings) in the second portion or in the visual marker.

In some implementations, at block 810, the method 800 determines a relative positioning between a detecting electronic device and the visual marker based on the image or images. In some implementations, the relative positioning determines the relative pose (e.g., position and orientation) of the visual marker with respect to the detecting electronic device. In some implementations, the relative positioning is determined using computer vision techniques (e.g., VIO or SLAM) or Perspective-n-Point (PNP) techniques. In some implementations, relative positioning is determined based on stereo image processing (e.g., disparity-based estimation). In some implementations, relative positioning is determined based on deep learning (e.g., convolutional neural networks CNN)). In some implementations, the relative positioning determines distance or direction from the detecting electronic device to the visual marker.

In some implementations, the relative positioning is determined at the detecting electronic device by identifying the size or scale of the detected visual marker in the captured image. In some implementations, a distance between the detecting electronic device and the detected visual marker can be determined based on the size of the visual marker. In some implementations, the size or shape of visual marker can be encoded in the visual marker and then directly decoded from the image of the physical environment. In some implementations, the size or shape of visual marker is preset and known by the detecting electronic device. In some implementations, the size or shape of the visual marker is determined using VIO, SLAM, RGB-D image processing or the like at the detecting electronic device.

Alternatively, the distance between the detecting electronic device and the detected visual marker can be determined based on a depth sensor at the detecting electronic device detecting the visual marker in the physical environment. In some implementations, the depth sensor at the detecting electronic device uses stereo-based depth estimation. In some implementations, the depth sensor at the detecting electronic device is a depth-only sensor (e.g., time of flight, structured light).

Figure 9:
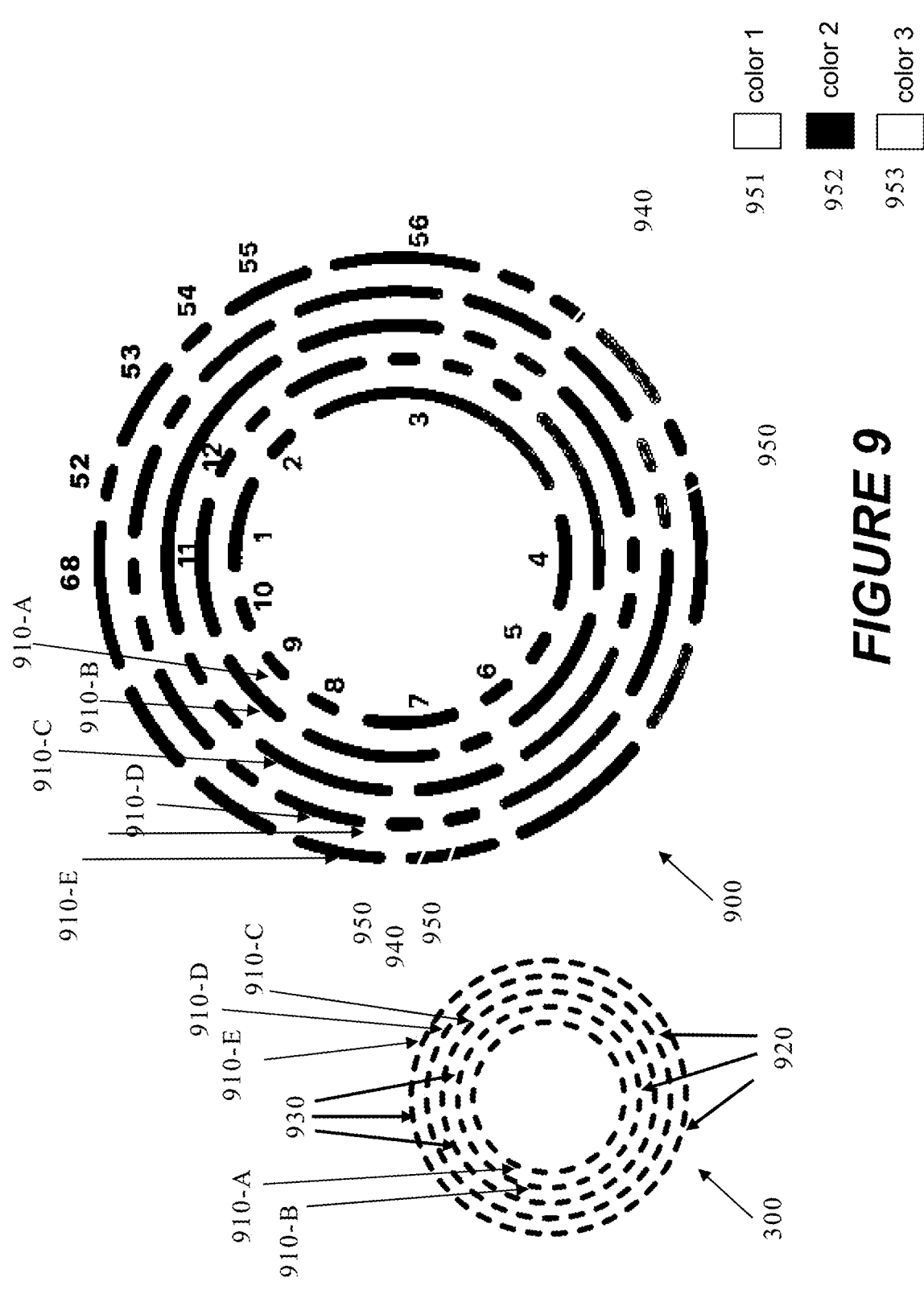
FIG. 9 illustrates an exemplary visual marker that conveys information using gaps in a plurality of increasingly larger markings and conveys information in colored sub-markings in the plurality of increasingly larger markings in accordance with some implementations.

FIG. 9 illustrates an exemplary visual marker 900, which indicates orientation and conveys information using gaps in a plurality of markings arranged in a corresponding plurality of shapes of increasing size, and conveys information in colored sub-markings in the plurality of markings in accordance with some implementations. In some implementations, the visual marker 900 includes a plurality (e.g., a series) of increasingly larger surrounding markings, where each of the markings is the same shape. In some implementations, the visual marker 900 includes a plurality of increasingly larger markings, where at least one of the markings uses a different shape.

In some implementations, information is conveyed in the plurality of markings (e.g., rings 910A-910E) of the visual marker 900 using 2 different techniques. In some implementations, information is conveyed in the plurality of markings (e.g., rings 910A-910E) using a first technique (e.g., closing or not closing template gaps 920 between template sub-markings 930) to form the arcs 950 with the gaps 940 in-between, and a second technique (e.g., color coding a preset number of the arcs 950) using the arcs 950 in the visual marker 900.

In some implementations, information is conveyed using the first technique in the visual marker 900 before using the second technique in the visual marker 900.

As shown in FIG. 9, the visual marker 900 includes a plurality of concentric rings 910A-910E where each of the concentric shapes has a different number of the template gaps 920 that are used to indicate orientation and convey information. In some implementations, each marking of the plurality of markings (e.g., rings 910A-910E) is formed of a set of the template sub-markings 930 arranged according to a respective shape and separated by the template gaps 920. In some implementations, the visual marker 900 is another instance (e.g., conveying information) of the visual marker 300 template.

In some implementations, each of the rings 910A-910E when encoded with information (e.g., using the template gaps 920) includes a number of the arcs 950 with the gaps 940 in-between. In some implementations, each of the template gaps 920 represent at least a binary digit (bit) of information. In some implementations in the visual marker 900, empty template gaps 920 represent a "0" and forms the gaps 940, and each filled template gap 920 represents a "1" and forms the larger sized arcs 950. In some implementations, the size of the template gaps 920 in each of the rings 910A-910E are the same. In some implementations, the size of the template gaps 920 in all of the rings 910A-910E are the same. In some implementations, the visual marker 900 encodes 128 bits (e.g., including parity) using the template gaps 920 between the template sub-markings 930.

In some implementations, the visual marker 900 has a single detectable orientation. In some implementations, the visual marker 900 uses the template gaps 920 to indicate the single detectable orientation. In some implementations, the number of template gaps 920 in each of the rings 910A-910E are selected so that there is only one orientation where all the template gaps 920 align in the visual marker 900. In some implementations, respective numbers of the template gaps 920 in each of the rings 910A-910E are respectively selected (e.g., 17, 23, 26, 29, 33) to not have a common divisor, which ensures the single orientation of the visual marker 900.

In some implementations, the orientation may be used to determine where to start decoding or otherwise to interpret the information conveyed by (e.g., encoded in) the template gaps 920 present in the positions between the template sub-markings 930 in the visual marker 900. For example, decoding data in the oriented visual marker 900 may begin at 12 o'clock position and go counterclockwise from the innermost ring 910A to the outermost ring 910E to interpret the information represented using the template gaps 920.

In some implementations, a first plurality (e.g., subset) of the arcs 950 in the rings 910A-910E are encoded using color to further convey information. In some implementations, the first plurality of the arcs 950 is a preset number (e.g., 56) of the arcs 950 that are encoded using color to further convey information using the second technique. In some implementations, the color encoding in the second technique uses a minimum number of the arcs 950.

In some implementations, when an instance of the visual marker 900 conveys information in the template gaps 920, a corresponding number of arcs 950 are formed in the rings 910A-910E and each of the first plurality of the arcs 950 conveys additional information using a first color or a second color. As shown in FIG. 9, the arcs 950 of the visual marker 900 are either a first color 951 (e.g., grey) or a second color 952 (e.g., black). In some implementations, the arcs 950 with the first color 951 represent a "0", and the arcs 950 with the second color 952 represents a "1". In some implementations, the first plurality of the arcs 950 are decoded in sequence. For example, as shown in FIG. 9, the first plurality of the arcs 950 (e.g., 56 of the 68 arcs 950) are decoded from 12 o'clock on the innermost ring 910A to 5 arcs 950 in the outermost ring 910E, and the innermost ring 910A may be decoded as 1101111001. In some implementations, a length of the arcs 950 does not influence information conveyed by the visual marker 900 using color.

In some implementations, the arcs 950 use two colors to encode one bit in each of the first plurality of the arcs 950. In some implementations, the visual marker 900 uses 4 colors for the arcs 950 so that each of the arcs 950 that conveys information conveys 2 bits (e.g., 11, 10, 01, 00) of information. In some implementations, more than 4 colors may be used to convey information using the second technique in the visual marker 900.

In some implementations, the preset number of the first plurality of the arcs 950 is implemented in the visual marker 900 using an indicator or a "flip arc" that interchanges arcs 950 and the gaps 940 when the number of arcs 950 is below a threshold. In one example, the threshold number (e.g., minimum) for the first plurality of arcs 950 may be 56, and when the encoded visual marker 900 results in 30 arcs 950, the "flip arc" is enabled and the information conveyed using (e.g., the first technique) the template gaps 920 between the template sub-markings 930 is interchanged so that the preset number for the first plurality of arcs 950 are available for use with the second technique in the visual marker 900. In this example, the first encoding of the template gaps 920 uses "closed" to encode a "1" bit and "open" to encode a "0" bit in each respective template gap 920, which results in 30 arcs

950. Accordingly, the "flip arc" is enabled and the data encoded in the template gaps is "flipped" so that in this second encoding of the template gaps 920 uses "closed" to encode a "0" bit and "open" to encode a "1" bit in each respective template gap 920, which results in 98 arcs 950 (e.g., that is over the minimum or preset number of 56 for the first plurality of the arcs 950).

In some implementations, a data value (e.g., bit) needs to be assigned to each color (e.g., for the arcs 950) to convey information using the second technique in the visual marker 900. In some implementations, the first arc of the first plurality of the arcs 950 that encode information using color indicates which color of the 2 colors in the visual marker 900 is assigned the data value "1" and the second color becomes the data value "0". In some implementations, any of the arcs 950 may be used to indicate the color assigned to the data value "1". In some implementations, a preset sequence of the arcs 950 are used to assign data values to a plurality of colors used in the arcs 950. In some implementations, the first 8 arcs of the first plurality of the arcs 950 indicates data values (e.g., 111, 110, 101, 100, 011, 010, 001, 000) that are respectively assigned to 8 colors used in a visual marker such as the visual marker 900.

In some implementations, a characteristic of the first color 951 and the second color 952 (e.g., the plurality of colors used in the second technique) is used to assign the data values (e.g., highest to lowest data values) to the 2 colors in the visual marker 900. For example, a luminance characteristic of the 2 colors can be used to assign the data values. As shown in FIG. 9, a luminance value of the first color 951 is greater than a luminance value of the second color 952. In some implementations of the first color 951 and the second color 952, the smallest luminance value is assigned the data bit "0" or the largest luminance value is assigned the data bit "1". In some implementations, an opacity characteristic of the colors used in the visual marker 900 is used to assign the data values.

In some implementations, a relationship between the first color 951 and the second color 952 (e.g., the plurality of colors used in the second technique) is used to assign the data values (e.g., highest to lowest data values) to the 2 colors in the visual marker 900. In some implementations, a background color is provided for the visual marker 900. As shown in FIG. 9, the background color is a third color 953 (e.g., white). In some implementations, the colors used to convey information using the second technique in the arcs 950 (or the first plurality of arcs 950) are assigned data values based on a relationship to the background color. For example, using a luminance relationship, the first color 951 is closer to the luminance of the third color 953 and the first color 951 is accordingly assigned the data value "0" (and data bit "1" is assigned to the second color 952). In some implementations, other relationships between the colors used in the first plurality of arcs 950 in a visual marker and the background color are used to assign data values to the colors.

FIG. 10 is a flowchart illustrating an exemplary method of decoding a visual marker that conveys information using color in a plurality of elements forming a plurality of markings arranged in a corresponding plurality of shapes of increasing size in accordance with some implementations. In some implementations, a relationship among colors in a visual marker is used to decode a corresponding data value assigned to each of the colors used to convey information. In some implementations, the plurality of markings are arranged in a corresponding plurality of expanding concentric rings. In some implementations, the method 1000 is performed by a device (e.g., electronic device 120, 200 of FIGS. 1-2). The method 1000 can be performed using an electronic device or by multiple devices in communication with one another. In some implementations, the method 800 is performed by processing logic, including hardware, firmware, software, or a combination thereof. In some implementations, the method 1000 is performed by a processor executing code stored in a non-transitory computer-readable medium (e.g., a memory).

At block 1010, the method 1000 obtains an image of a physical environment including a visual marker that includes a plurality of elements. In some implementations, the plurality of elements are sequentially arranged in the visual marker. In some implementations, the plurality of elements may be segments or sub-markings forming a plurality of increasingly larger markings having a respective shape. In some implementations, the plurality of markings form a plurality of concentric identical symmetric shapes of increasing size (e.g., see block 810). In some implementations, the plurality of elements are variably sized arcs in a plurality of concentric identical symmetric rings of increasing size that form the plurality of markings.

In some implementations at block 1010, the visual marker is viewable at a surface of an object in the physical environment. In some implementations at block 1010, an image sensor at an electronic device captures the image of the physical environment including the visual marker (e.g., see block 810).

At block 1020, the method 1000 determines a color characteristic of the visual marker based on the image. In some implementations, a color characteristic such as but not limited to luminosity, opacity, or the like of colors in the visual marker (e.g. optionally a background color) is determined. In some implementations, a color characteristic determines that a particular color is in a particular position on the visual marker. In some implementations, the color characteristic is determined using the color(s) is in a particular element(s) (e.g., a sequential position or an ordered position) in the plurality of elements of the visual marker.

At block 1030, the method 1000 determines data values for colors exhibited by the plurality of elements, the data values determined based on the determined color characteristic. In some implementations, a data value of a color red is assigned "0" based on red being the lighter (e.g., luminosity, opacity, etc.) of the two colors in the visual marker. In some implementations, a data value of a color red is assigned "0" based on red being closer to the color characteristic (e.g., luminosity, opacity, etc.) of a background color in the visual marker. In some implementations, a data value of a color red is assigned "1" based on the color red being found in a first element of a sequence of the plurality of elements on the visual marker. In some implementations, a data value of a color red is assigned "1" based on the color red being found in a particular element of the plurality of elements on the visual marker. In some implementations, a data value for a set of 4 colors found in the plurality of element in the visual marker may be assigned data values 11, 10, 01, 00, respectively, based on the determined color characteristic.

At block 1040, the method 1000 decodes data encoded in the colors exhibited by the plurality of elements based on the determined data values for the colors. In some implementations, a sequence of colored elements may be decoded to a sequence of data based on the determined data values for the colors. For example, in a visual marker using the two colors red and blue in the plurality of elements, a sequence of red element, red element, blue element may be decoded to a 0,0,1 sequence of bits. In some implementations, clustering such as semantic segmentation can be used for classifying the plurality of markings into one of two color classes encoding information.

In some implementations at block 1040, the method 1000 determines an orientation of the visual marker before decoding the plurality of elements (see block 830). In some implementations at block 1040, the method 1000 further decodes the data (e.g., encoded color data) of the visual marker sequentially in the plurality of elements (e.g., a preset order such as by innermost to outermost marking and clockwise/counterclockwise) from a starting position of the visual marker based on the orientation. In some implementations at block 1040, the method 1000 decodes the data of the visual marker into binary data such as strings or other payloads to initiate payments, link to websites, link to location-based experiences or contextual-based experiences, or launch into other web-based experiences. In some implementations, the usage of the visual marker in terms of user experience after decoding can be arbitrary.

Figure 11:
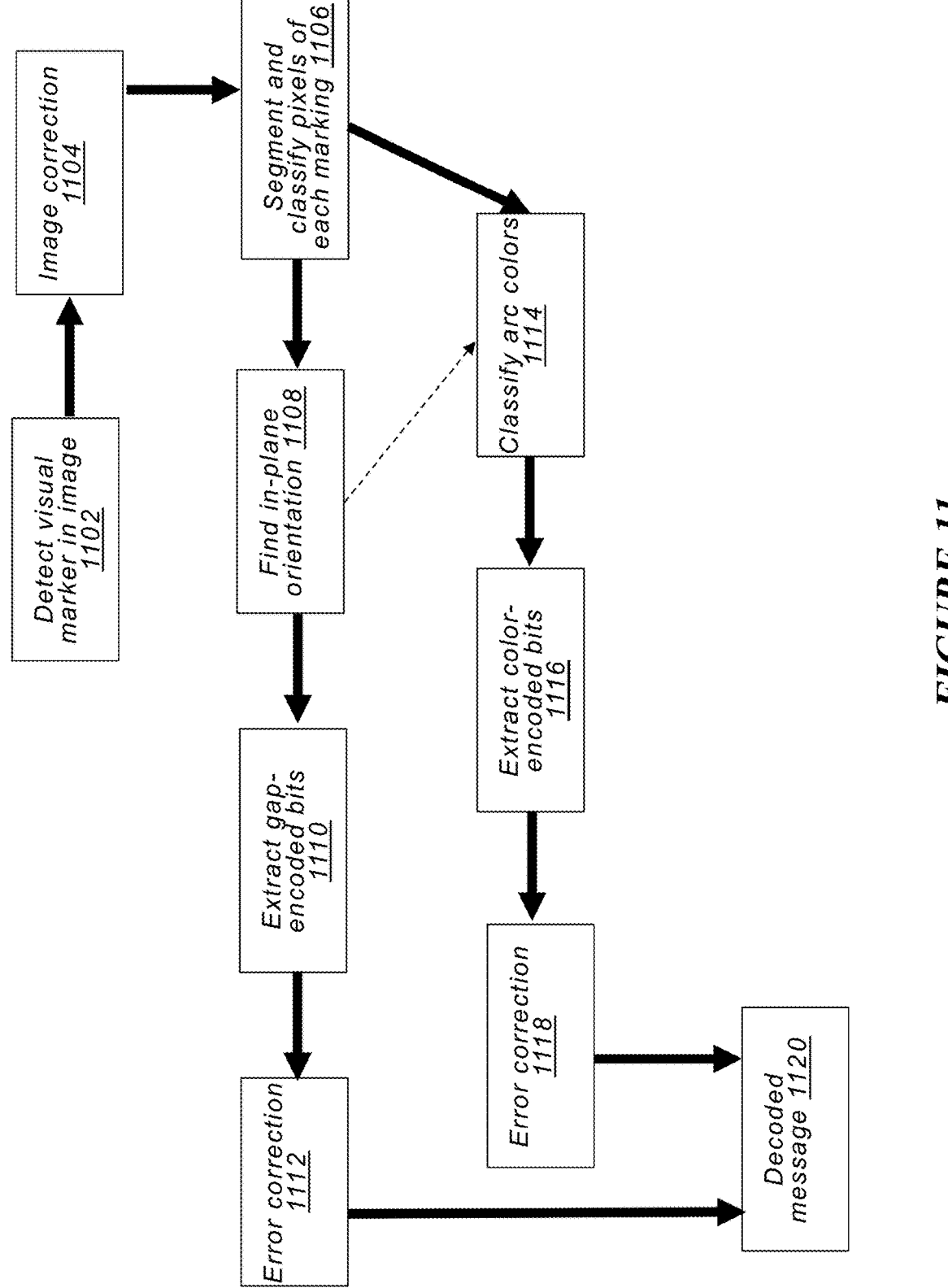
FIG. 11 is a flowchart illustrating an exemplary method of decoding a visual marker that indicates orientation and conveys information using gaps in a plurality of markings arranged in a corresponding plurality of shapes of increasing size in accordance with some implementations.

FIG. 11 is a flowchart illustrating an exemplary method of decoding a visual marker that indicates orientation and conveys information by modifying gaps in a plurality of markings arranged in a corresponding plurality of shapes of increasing size in accordance with some implementations. In some implementations, the method 1100 further decodes color in a plurality of elements forming the plurality of markings arranged in the corresponding plurality of shapes of increasing size. In some implementations, a relationship among colors in a visual marker is used to decode a corresponding data value assigned to each of the plurality of elements. In some implementations, the method 1100 is performed by a device (e.g., electronic device 120, 200 of FIGS. 1-2). The method 1000 can be performed using an electronic device or by multiple devices in communication with one another. In some implementations, the method 1100 is performed by processing logic, including hardware, firmware, software, or a combination thereof. In some implementations, the method 1100 is performed by a processor executing code stored in a non-transitory computer-readable medium (e.g., a memory).

At block 1102, the method 1100 detects a visual marker that includes a plurality of markings arranged in a corresponding plurality of shapes in an image of a physical environment. In some implementations, each marking of the plurality of markings is formed of a set of template sub-markings arranged according to a respective shape and separated by template gaps. In some implementations, the plurality of markings form a plurality of identical symmetric at least partially surrounding circles, ellipses, rectangles, polygons, or other shapes of different sizes. In some implementations, the plurality of markings are concentric. In some implementations, a first marking corresponds to an inner ring, a second marking corresponds to a second ring that surrounds the first ring, a third marking corresponds to a third ring that surrounds the second ring, and so on. In some implementations, the gaps in the plurality of markings may have a consistent size. In some implementations, the visual marker has a unique detectable orientation.

In some implementations at block 1102, an image sensor at an electronic device captures the image of the physical environment including the visual marker. In some implementations, a detecting electronic device (e.g., image sensor) detects the visual marker in the image of the physical environment (e.g., see block 810). In some implementations, the visual marker is viewable at a surface of an object in the physical environment.

At block 1104, the method 1100 performs image correction for the detected visual marker in the image of the physical environment. In some implementations at block 1104, the image may be rectified to account for image capture conditions. In some implementations, image correction for the visual marker in the image of the physical environment includes color correction such as local white balancing of colors in the visual marker. In some implementations, the image correction for the visual marker in the image includes correcting for occlusions or spatially varying illumination at the detected visual marker.

At block 1106, the method 1100 classifies pixels of each marking. In some implementations classifying pixels of each marking includes segmenting the pixels into a plurality of classes that each represent one of the plurality of markings. In some implementations classifying pixels of each marking includes clustering pixels of the plurality of markings into one of the corresponding shapes of the plurality of markings. In some implementations, clustering uses a semantic segmentation machine learning model to classify pixels of the plurality of markings into a plurality of classes that each represent one of the corresponding plurality of shapes and at least one other class (e.g., error, outlier, occlusion, etc.). In some implementations, clustering such as semantic segmentation can be used for classifying the plurality of markings into one of two color classes encoding information.

At block 1108, the method 1100 finds an in-plane orientation of the visual marker according to template gaps in sets of template sub-markings for each of the plurality of markings depicted in the image. In some implementations, the orientation of the visual marker is determined according to a first set of the template gaps in the markings of the plurality of markings depicted in the image (e.g., see block 820). In some implementations, determining the orientation includes determining a unique orientation of the visual marker corresponding to relative positioning of a first set of gaps of the plurality of markings.

At block 1110, the method 1100 decodes data encoded in at least one of the template gaps based on the orientation of the visual marker. In some implementations, the data is encoded using a second set of template gaps in the plurality of markings. In some implementations, the second set of gaps and the first set of gaps are the same gaps in the plurality of markings. In some implementations, the data is encoded in the second set of gaps that is different from the first set of gaps in the plurality of markings. In some implementations at block 1110, the method 1100 further decodes the data of the visual marker sequentially in the plurality of markings (e.g., preset order based on version or visual marker type or based on the orientation) from a starting position of the visual marker (e.g., see FIG. 8).

At block 1112, the method 1100 performs error correction on the data decoded from at least one of the gaps (e.g., 320) of the visual marker. In some implementations, the error correction is based on a plurality of parity bits encoded in the template gaps of the visual marker. In some implementations, the error correction uses known Reed-Solomon error correction techniques.

At block 1114, the method 1100 classifies colors of the visual marker. In some implementations, the colors (e.g., arcs 950) are classified based on at least one color characteristic determined for colors exhibited by a plurality of elements (e.g., segments) forming the plurality of markings. In some implementations, data values for the colors in the plurality of elements are determined based on the determined color characteristic. For example, a data value of a color red is assigned "0" based on red being the lighter (e.g., luminosity, opacity, etc.) of the two colors in the visual marker. In some implementations, a data value of a color red is assigned "0" based on red being closer to the color characteristic (e.g., luminosity, opacity, etc.) of a background color in the visual marker.

At block 1116, the method 1100 extracts color-encoded data in the colors exhibited by the plurality of elements based on the determined data values for the colors. In some implementations, the sequence of colored elements (e.g., the first plurality of arcs 950) may be decoded to a sequence of data based on the determined data values for the colors. For example, in a visual marker using the two colors red and blue in the plurality of elements, a sequence of red element, red element, blue element may be decoded to a 0,0,1 sequence of bits. In some implementations, the color of the plurality of elements encodes more than 1 bit of data.

In some implementations at block 1116, the method 1100 further decodes data encoded in the colors exhibited by the plurality of elements based on the determined data values for the colors. In some implementations, a sequence of colored elements may be decoded to a sequence of data (e.g., preset order based on version or visual marker type or based on the orientation) from a starting position of the visual marker (see FIG. 10).

At block 1118, the method 1100 performs error correction on the color-encoded data extracted from the colors exhibited by the plurality of elements of the visual marker. In some implementations, the error correction is based on a plurality of parity bits encoded in the plurality of elements of the visual marker. In some implementations, the error correction uses known Reed-Solomon error correction techniques.

In some implementations at block 1120, the method 1100 further decodes the data of the visual marker into binary data such as strings or other payloads to initiate payments, link to websites, link to location-based experiences or contextual-based experiences, or launch into other web-based experiences. In some implementations, the usage of the visual marker in terms of user experience after decoding can be arbitrary.

In some implementations at block 1120, the method 1100 only decodes data encoded in the template gaps (e.g., skip blocks 1108-1112). In some implementations at block 1120, the method 1100 only decodes data encoded in the colors (e.g., skip blocks 1114-1118). In some implementations, portions of the method 1100 are performed in a different sequential order or concurrently. For example, the block 1114 may be performed after the block 1108 as shown by the dashed arrow. For another example, the block 1108 may be performed after the block 1110 as shown by the dashed arrow.

Figure 12:
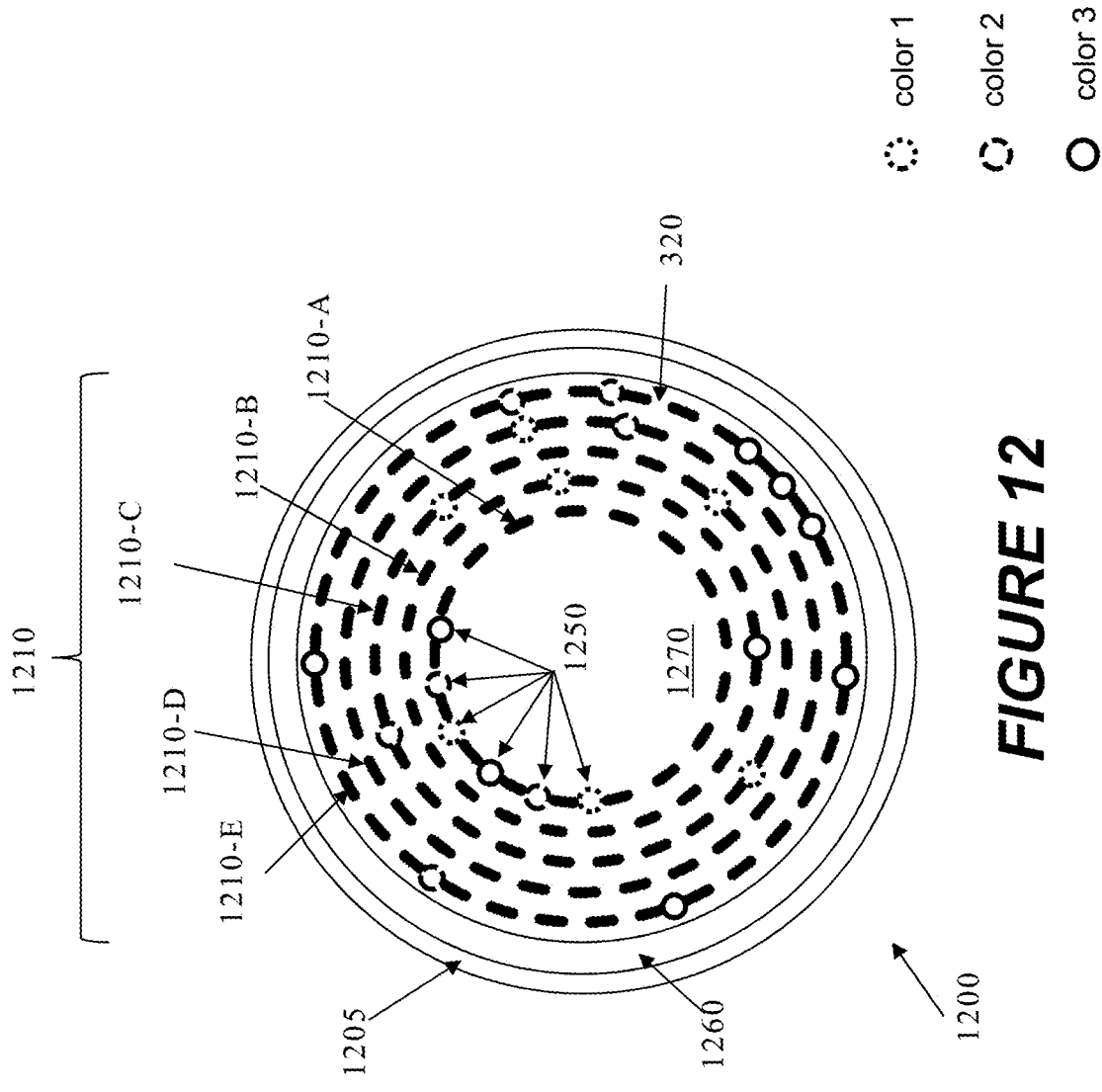
FIG. 12 is a diagram illustrating another example visual marker that includes a plurality of markings arranged in a corresponding plurality of shapes of increasing size in accordance with some implementations.

FIG. 12 is a diagram illustrating another example visual marker that includes a plurality of markings arranged in a corresponding plurality of shapes of increasing size in accordance with some implementations. In some implementations, a visual marker 1200 includes a plurality of concentric rings 1210A-1210E that each include a different number of template gaps that are used to convey information. In some implementations, the visual marker 1200 includes additional features that may be used in combination with, to supplement, or to replace features or capabilities of visual markers as described herein in accordance with some implementations.

As shown in FIG. 12, the visual marker 1200 includes a first portion 1205 for detection, a second portion 1250 to identify a set of different colors (e.g., 2, 3, 4, 8, etc.) used in the visual marker 1200, and a third portion 1210 (e.g., rings

1210A-1210E) to encode data in the visual marker 1200. In some implementations, the first portion 1205 includes a preset (asymmetric) shape for detection. As shown in FIG. 12, the first portion 1205 is an outer ring forming an asymmetric border (e.g., asymmetric fill, asymmetric shading, gradient or the like). In some implementations, the first portion 1205 is an inner area having a predefined asymmetric shape. In some implementations, the first portion 1205 is an asymmetric shape or logo in a center (e.g. center area 1270) of the visual marker 1200. In some implementations, the first portion 1205 is mapped to a color matching a preset value of binary information (e.g., always mapped to bit value "0").

In some implementations, the predefined shape of the first portion 1205 enables detection, rectification, or determination of orientation of visual marker 1200 (e.g., captured in an image). In some implementations, colors of the first portion 1205 are variable (e.g., different for different visual markers), and accordingly, the detection of the visual marker 1200 using the first portion 1205 is shaped-based and does not use color. In some implementations, the detection of the visual marker 1200 in an image can be accomplished using computer vision techniques. In some implementations, the visual marker 1200 is rectified based on the image. In some implementations, rectification warps the visual marker from the image to make the visual marker appear flat when viewed from a directly overhead orientation.

As shown in FIG. 12, the second portion 1250 is distinct and separate from the first portion 1205, but includes elements that are part of the third portion 1210.

As shown in FIG. 12, the second portion 1250 includes 6 locations where the set of 3 colors (color 1, color 2, color 3) for the visual marker 1200 are repeated in sequence. In some implementations, the second portion 1250 includes a plurality of pixels (e.g., 3×3, 4×4, 12×12, etc.) sufficiently sized for detection and identification of the set of colors in the second portion 1250. In some implementations, the set of 3 colors (color 1, color 2, color 3) of the second portion 1250 are used to encode 2 bits of data at each gap 320 of the visual marker 1200. In some implementations, the color 1 represents "11", the color 2 represents "10", the color 3 represents "01", and the background color represents "00" in the gaps 320 in at least the rings 1210B-1210E.

In some implementations, the third portion 1210 encodes the data of the visual marker 1200 using graphic segments to fill the gaps 320. In some implementations, the gaps 320 of the visual marker 1200 are encoded using graphic segments that are parameterized by size, shape, color, orientation, or the like of graphical elements. Then, the data of the visual marker 1200 (e.g., data portion) is decoded based on the graphic segments and the set of colors (e.g., 1250). In some implementations, the second portion 1250 uses a different prescribed shape than the graphic segments used for the third portion 1210 of the visual marker 1200. In some implementations, the second portion 1250 uses known locations based on the specific overall predefined shape of the first portion 1205 or based on the specific overall shape of the visual marker 1200.

In some implementations, the set of colors (e.g., colors 1-3) of the visual marker 1200 are not pre-defined (e.g., the set of colors used for a given visual marker that encodes a first data item may be different from the set of colors used for another visual marker that encodes a second data item). In various implementations, the colors of the visual marker 1200 can be selected in any manner when a visual marker is designed, created, or modified.

In some implementations, the set of colors (e.g., the colors in the second portion 1250) may be determined based on detectability. In some implementations, detectability of the data encoding colors is based on one or more of separation in a 3D color space, lighting conditions, printing conditions, displaying conditions, image capture sensors, or aesthetic information.

In some implementations, a detection zone 1260 is used to detect the visual marker 1200 (e.g., in an image). In some implementations, the detection zone 1260 is a single color (e.g., grey, white). In some implementations, the detection zone 1260 uses one or more colors that are not used elsewhere in the visual marker 1200. In some implementations, the detection zone 1260 is an outer area having predefined shape or a predefined ratio of dimensions (e.g., thickness to diameter). In some implementations, the detection zone 1260 is a white ring at least 2 pixels wide as seen by an image sensor on an electronic device. In some implementations, the detection of the visual marker 1200 in an image (e.g., of a physical environment) can be accomplished using machine learning (ML) to detect the detection zone 1260. In some implementations, the first portion 1205 includes or surrounds the detection zone 1260. In some implementations, colors of the detection zone 1260 are consistent (e.g., the same for different visual markers), and accordingly, the detection of the visual marker 1200 is shape and color based.

As shown in FIG. 12, the visual marker 1200 includes a central area 1270 in some implementations. In some implementations, the central area 1270 is used for decoration (e.g., a company logo). In some implementations, the central area 1270 includes specific shapes or color for detection, specific color(s) for color correction (e.g., white balance), or specifically shaped, sized, or angled symbols for orientation or rectification of the visual marker 1200A (e.g., captured in an image of a physical environment).

In some implementations, an additional portion of the visual marker 1200 may be colored using a single color (e.g., white or grey). In some implementations, the additional portion of the visual marker 1200 is used to perform local white balancing of colors in the visual marker 1200 upon detection by an image sensor. In some implementations, the additional portion of the visual marker 1200 is used to detect spatially varying illumination at the detected visual marker or correct for any detected spatially varying illumination. For example, when there is a shadow detected in the center area 1270 and a region outside the third portion 1210 (e.g., across part of the visual marker 1200), the detected shadow in the additional region can be used to correct for the color changes in the visual marker 1200 (e.g., first portion 1205, third portion 1210) caused by the shadow. In some implementations, the spatially varying illumination at a detected visual marker is caused by a light source, uneven lighting, objects in the physical environment, or the like. In some implementations, the additional portion is the detection zone 1260 or the center area 1270.

As shown in FIG. 12, the visual marker 1200 is generally in the shape of a circle. However, implementations of the visual marker 1200 are not intended to be so limited. In some implementations, other shapes of the visual marker 1200 can be used. In some implementations, the visual marker 1200 is an asymmetric shape, a symmetric shape, an ellipse, a rectangle, a triangle, a bow tie, or the like. In some implementations, the first portion 1205, the second portion 1250, and the third portion 1210 are variously spatially separated in the visual marker 1200.

In some implementations, a version portion of the visual marker 1200 can be used to determine a version of the visual marker 1200. In some implementations, the version(s) of the visual marker 1200 varies a number of the set of colors (e.g., the second portion 1250), varies an amount of data (e.g., a number of rings or a number of gaps in the rings in the third portion 1210), a size of the marker, types of shapes, or varies the graphic segments used to encode data (e.g., the third portion 1210). In some implementations, the version(s) of the visual marker 1200 is encoded in an inner ring (e.g., 1210A) or another portion of the visual marker (e.g., the center area 1270).

In some implementations, detecting a visual marker is a computer vision analysis that classifies an image as containing the visual marker or not. In some implementations, the computer vision analysis performs shape detection for the first portion 1205. In some implementations, the computer vision analysis can be performed using ML. ML methods for object detection include machine learning-based approaches or deep learning-based approaches. In some implementations, machine learning approaches first define features from a set of data that contains both the inputs and the desired outputs, then uses a classification technique to identify an object. In some implementations, deep learning techniques do end-to-end object detection without specifically defining features, for example, using CNN.

Various implementations disclosed herein include devices, systems, and methods that provide a visual marker including various features described herein (e.g., individually or in combination).

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for case of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at an electronic device having a processor:
obtaining an image of a physical environment, the physical environment comprising a visual marker comprising a plurality of markings arranged in a corresponding plurality of shapes, each marking being formed of a set of sub-markings separated by gaps and arranged according to a respective shape;
determining an orientation of the visual marker according to a first set of the gaps in at least two of the markings of the plurality of markings depicted in the image; and
decoding data encoded in a second set of the gaps based on the orientation of the visual marker.

2. The method of claim 1, wherein determining the orientation comprises determining a unique orientation corresponding to relative positioning of the first set of gaps.

3. The method of claim 1, wherein the decoding comprises clustering pixels of the plurality of markings into one of the corresponding plurality of shapes.

4. The method of claim 3, wherein the clustering uses a data driven, learned segmentation method to classify pixels of the plurality of markings into a plurality of classes that each represent one of the corresponding plurality of shapes and at least one other class.

5. The method of claim 3, wherein the plurality of markings is a plurality of concentric markings, wherein the clustering comprises:
randomly selecting a set of pixels from pixels of the plurality of markings; and
using the set of pixels to hypothesize a modeled shape;
repeating the randomly selecting a set of pixels and using the set of pixels to hypothesize steps a prescribed number of times;
selecting one of the sets of pixels based on a number of the pixels of the plurality of markings close to the corresponding modeled shape;
determining a first shape of the corresponding plurality of shapes based on the selected one of the sets of pixels; and
estimating remaining shapes of the corresponding plurality of shapes using preset size and distance relationships to the first shape.

6. The method of claim 3, wherein the plurality of markings is a plurality of concentric markings, wherein the clustering comprises:
randomly selecting a set of pixels from pixels of the plurality of markings; and
using the set of pixels to hypothesize a modeled shape, wherein the modeled shaped is a first shape of the corresponding plurality of shapes;
estimating remaining shapes of the corresponding plurality of shapes using preset size and distance relationships to the first shape;
determining a number of the pixels of the plurality of markings close to the first shape and estimated remaining shapes of the corresponding plurality of shapes;
repeating the randomly selecting a set of pixels, using the set of pixels to hypothesize a modeled shape, estimating remaining shapes of the corresponding plurality of shapes, and determining a number of the pixels steps a prescribed number of times;
selecting one of the sets of pixels based on the determined number of the close pixels of the pixels of the plurality of markings;
determining the corresponding plurality of shapes based on the selected one of the sets of pixels.

7. The method of claim 1, wherein a first color of the plurality of markings of the visual marker and a second color for a background of the visual marker are selected anywhere within a spectrum of colors.

8. The method of claim 1, further comprising:

encoding a version of the visual marker in a first marking of the plurality of markings; and encode data of the visual marker in remaining markings of the plurality of markings.

9. The method of claim 1, further comprising:

determining data values for colors exhibited by a plurality of elements forming the plurality of markings, wherein the data values are determined based on a color characteristic of the colors; and decoding additional data encoded in the colors exhibited by the plurality of elements based on the determined data values for the colors.

10. A method comprising:

at an electronic device having a processor:

obtaining an image of a physical environment, the physical environment comprising a visual marker comprising a plurality of elements;

determining a color characteristic of the visual marker based on the image;

determining data values for colors exhibited by the plurality of elements, the data values determined based on the determined color characteristic; and decoding data encoded in the colors exhibited by the plurality of elements based on the determined data values for the colors.

11. The method of claim 10, wherein the plurality of elements are sequentially arranged on the visual marker, and wherein the colors of the visual marker includes a set of 4 colors, further comprising respectively assigning the data values 11, 10, 01, 00 to a corresponding one of the set of 4 colors.

12. The method of claim 10, wherein determining data values for colors exhibited by the plurality of elements comprises determining a relationship for the determined color characteristic among the colors, and assigning the data values based on the determined relationship.

13. The method of claim 10, wherein determining data values for colors exhibited by the plurality of elements comprises comparing the determined color characteristic of the colors to a background color of the visual marker, and assigning the corresponding data values based on the comparison.

14. The method of claim 10, wherein the visual marker comprises a plurality of markings arranged in a corresponding plurality of shapes, each marking being formed of a set of sub-markings separated by sub-gaps and arranged according to a respective shape.

15. The method of claim 14 further comprising, when the number of the plurality of elements is below a threshold, setting a flip indicator in the visual marker; and interchanging the data values in the sub-gaps of the plurality of markings before encoding the data in the colors exhibited by the plurality of elements colors.

16. A system comprising:

a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising:

obtaining an image of a physical environment, the physical environment comprising a visual marker comprising a plurality of elements;

determining a color characteristic of the visual marker based on the image;

determining data values for colors exhibited by the plurality of elements, the data values determined based on the determined color characteristic; and decoding data encoded in the colors exhibited by the plurality of elements based on the determined data values for the colors.

17. The system of claim 10, wherein the plurality of elements are sequentially arranged on the visual marker, and wherein the colors of the visual marker includes a set of 4 colors, further comprising respectively assigning the data values 11, 10, 01, 00 to a corresponding one of the set of 4 colors.

18. The system of claim 10, wherein determining data values for colors exhibited by the plurality of elements comprises determining a relationship for the determined color characteristic among the colors, and assigning the data values based on the determined relationship.

19. The system of claim 10, wherein determining data values for colors exhibited by the plurality of elements comprises comparing the determined color characteristic of the colors to a background color of the visual marker, and assigning the corresponding data values based on the comparison.

20. A non-transitory computer-readable storage medium, storing program instructions computer-executable on a computer to perform operations comprising:

obtaining an image of a physical environment, the physical environment comprising a visual marker comprising a plurality of elements;

determining a color characteristic of the visual marker based on the image;

determining data values for colors exhibited by the plurality of elements, the data values determined based on the determined color characteristic; and decoding data encoded in the colors exhibited by the plurality of elements based on the determined data values for the colors.

\* \* \* \* \*